(12) United States Patent
White, III et al.

(10) Patent No.: US 11,372,626 B2
(45) Date of Patent: Jun. 28, 2022

(54) METHOD AND SYSTEM FOR PACKAGING INFRASTRUCTURE AS CODE

(71) Applicant: JPMorgan Chase Bank, N.A., New York, NY (US)

(72) Inventors: James P White, III, Middletown, DE (US); Neil Aitken, Jackson Heights, NY (US); Esa Laine, New Albany, OH (US); Paul Richard Mcdowell, Newark, DE (US); Roy M Mpanju, Newark, DE (US); Trupti Anant Gaikwad, Jersey City, NJ (US); Nick Suttle, Brooklyn, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 65 days.

(21) Appl. No.: 16/935,730

(22) Filed: Jul. 22, 2020

(65) Prior Publication Data

US 2021/0042096 A1 Feb. 11, 2021

Related U.S. Application Data

(60) Provisional application No. 62/883,872, filed on Aug. 7, 2019.

(51) Int. Cl.
*G06F 8/60* (2018.01)
*G06F 8/35* (2018.01)
(Continued)

(52) U.S. Cl.
CPC .................. *G06F 8/35* (2013.01); *G06F 8/60* (2013.01); *G06F 8/71* (2013.01); *G06F 11/3604* (2013.01);
(Continued)

(58) Field of Classification Search
CPC ........... G06F 8/35; G06F 8/60; G06F 8/71–75
See application file for complete search history.

(56) References Cited

U.S. PATENT DOCUMENTS 10,791,021 B1 * 9/2020 Sharma ................. G06F 16/951
2017/0026416 A1 * 1/2017 Carpenter ........... H04L 41/0866
(Continued)

FOREIGN PATENT DOCUMENTS

WO 2019/089443 5/2019

OTHER PUBLICATIONS

Official communication (Search Report and Opinion) in W.I.P.O Patent Application No. PCT/US2020/044490, dated Oct. 16, 2020.
(Continued)

*Primary Examiner* — Duy Khuong T Nguyen
(74) *Attorney, Agent, or Firm* — Greenblum & Bernstein, P.L.C.

(57) ABSTRACT

Various methods, apparatuses/systems, and media for providing IaC templates in a cloud environment are provided. A processor creates a plurality of IaC templates. Each of the plurality of IaC templates includes instructions to build at least a portion of an infrastructure. The plurality of IaC templates is stored in a central repository. The processor collects one or more of the plurality of the created IaC templates from the central repository in order to build a desired infrastructure package. The processor also executes at least one of updating, removing, upgrading, downgrading, and verifying the infrastructure package in the central repository. Each of the plurality of IaC templates also includes metadata identifying at least one of a package, installation instructions of the package, at least one dependency of the package, a version of the package, and a size of the package.

15 Claims, 7 Drawing Sheets

(51) Int. Cl.
  *G06F 8/71* (2018.01)
  *H04L 67/10* (2022.01)
  *H04L 67/00* (2022.01)
  *G06F 11/36* (2006.01)

(52) U.S. Cl.
  CPC ............. *H04L 67/10* (2013.01); *H04L 67/34* (2013.01); *G06F 11/368* (2013.01); *G06F 11/3688* (2013.01)

(56) References Cited

U.S. PATENT DOCUMENTS

2017/0180422 A1  6/2017  Mizutani et al.
2020/0387357 A1* 12/2020 Mathon ................. G06F 9/5077
2021/0055917 A1*  2/2021  Khakare ............... G06F 3/0486

OTHER PUBLICATIONS

Packt, "Start Treating your Infrastructure as Code." Dec. 26, 2016, retrieved on Sep. 30, 2020 from https://hub.packtpub.com/start-treating-your-infrastructure-code/.
Chan, "15 Infrastructure as Code tools you can use to automate your deployments." In: Thorn Technologies LLC., Apr. 3, 2018, retrieved on Sep. 30, 2020 from https://www.thorntech.com/2018/04/15-infrastructure-as-code-tools/.
Morris, "Infrastructure as Code; Managing Servers in the Cloud." In: O'Reilly Media, Inc., Jun. 7, 2016, Retrieved on Sep. 30, 2020 from https://res.infoq.com/articles/book-infrastructure-as-code/en/resources/excerpt-for-infoq.pdf.

* cited by examiner

METHOD AND SYSTEM FOR PACKAGING INFRASTRUCTURE AS CODE

CROSS-REFERENCE TO RELATED APPLICATIONS

This application claims the benefit of priority from U.S. Provisional Patent Application No. 62/883,872, filed Aug. 7, 2019, which is herein incorporated by reference in its entirety.

BACKGROUND

1. Field of the Disclosure

Example embodiments generally relate to methods and systems for packaging infrastructure as code ("IaC"). In particular, example embodiments relate to methods and systems for building; and establishing a standard method to build, package, version and deploy IaC templates.

2. Background Information

Infrastructure as code, also referred to as IaC, is typically understood as programmable, or software-based infrastructure that typically defines a given infrastructure such as, e.g., a cloud-based infrastructure that includes a web server, a database, and a load balancer, in the form of a text file constituting a code. Typically, the IaC is sent to a compiler or interpreter that creates the actual infrastructure. Accordingly, IaC allows developers or operations teams to automatically manage a technology stack for an application through software instead of having to manually configure discrete hardware devices and operating systems. Typically, cloud vendors utilize IaC files, also referred to as templates, to programmatically define and manage cloud IaC.

Infrastructure-as-code tools can be declarative or imperative. A declarative programming approach outlines the desired, intended state of the infrastructure, but does not explicitly list the steps to reach that state. SQL is a commonly known declarative programming language. For example, AWS CloudFormation templates, among others, are written in the declarative style of infrastructure as code. In contrast, an imperative approach defines commands that enable the infrastructure to reach the desired state. Object-oriented languages, such as C++ and Java, can be used for imperative programming. In both approaches, infrastructure as code is configured on a template, where the user specifies the resources needed for each server in the infrastructure. Infrastructure-as-code templates can automatically execute the deployment of infrastructure, such as servers, databases and load balancers, with orchestration functionality.

In a large organization, several different teams may work on template development in parallel, and it may be difficult to keep the workflow organized as each team may build the infrastructure in a non-recorded, non-versioned and non-repeatable manner and typically does not implement a packaging specification. Therefore, there is a need for a common software packaging specification for IaC to streamline the software development lifecycle, and to reduce management costs.

SUMMARY

The present disclosure, through one or more of its various aspects, embodiments, and/or specific features or sub-components, may provide, among others, various systems, servers, devices, methods, media, programs, and vendor agnostic platforms for establishing a standard process to build, package, version and deploy providing Infrastructure as Code ("IaC") templates in a cloud environment.

According to an aspect of the present disclosure, a method for providing IaC templates in a cloud environment is provided. The method is implemented by a processor on a computing device. The method may include: creating, by the processor, a plurality of IaC templates, each of the plurality of IaC templates including instructions to build at least a portion of an infrastructure; storing, by the processor, the plurality of IaC templates in a central repository; collecting, by the processor, one or more of the plurality of the created IaC templates from the central repository in order to build a desired infrastructure package; and executing at least one of updating, removing, upgrading, and verifying, by the processor, the infrastructure package in the central repository. In exemplary embodiments, each of the plurality of IaC templates may include metadata identifying at least one of a package, installation instructions of the package, at least one dependency of the package, version of the package, and size of the package, but the disclosure is not limited thereto.

According to an aspect of the present disclosure, the method may further include: defining an infrastructure package for IaC; building the infrastructure package by collecting one or more of the plurality of the created IaC templates from the central repository; deploying the infrastructure package; and managing the infrastructure package.

According to a further aspect of the present disclosure, wherein defining the infrastructure package may further include: creating a configuration of the infrastructure package; validating the configuration of the infrastructure package; and executing a user-defined code within the infrastructure package.

According to yet another aspect of the present disclosure, wherein building the infrastructure package may further include: collecting specific files; processing the collected specific files to create at least one package artifact; and executing the user defined code on the collected specific files after at least one of the collecting, the processing and the creating.

According to another aspect of the present disclosure, wherein deploying the infrastructure package may further include: copying the package artifact to the central repository; registering the infrastructure package in the central repository; and executing the user defined code on the package artifact after at least one of the copying and the registering.

According to yet another aspect of the present disclosure, managing the infrastructure package may further include: downloading the infrastructure package from the central repository; validating the infrastructure package; performing a management action; and executing the user defined code on the downloaded infrastructure package after at least one of the validating and the performing the management action.

According to another aspect of the present disclosure, a computing device configured to implement an execution of a method for providing IaC templates in a cloud environment is provided. The computing device includes a display screen, a processor, a memory, and a communication interface coupled to each of the processor, the memory, and the display screen. When the method is being executed, the processor may be configured to: create a plurality of IaC templates, each of the plurality of IaC templates including instructions to build at least a portion of an infrastructure; store the plurality of IaC templates in a central repository; collect one or more of the plurality of the created IaC templates from the central repository in order to build a desired infrastructure package; and execute at least one of updating, removing, upgrading, and verifying the infrastructure package in the central repository. According to exemplary embodiments, each of the plurality of IaC templates may include metadata identifying at least one of a package, installation instructions of the package, one or more dependencies of the package, version of the package, size of the package, and any number of additional artifacts, such as files and/or directories, that should be included within the resulting package archive file, but the disclosure is not limited thereto.

According to yet another aspect of the present disclosure, the processor may be further configured to: define the desired infrastructure package for IaC; build the desired infrastructure package by collecting one or more of the plurality of the created IaC templates from the central repository; deploy the desired infrastructure package; and manage the desired infrastructure package.

According to a further aspect of the present disclosure, wherein in defining the infrastructure package, the processor may be further configured to: create a configuration of the infrastructure package; validate the configuration of the infrastructure package; and execute a user-defined code within the infrastructure package.

According to yet another aspect of the present disclosure, wherein in building the infrastructure package, the processor may be further configured to: collect specific files; process the collected specific files to create at least one package artifact; and execute the user defined code on the collected specific files after at least one of the collecting, the processing and the creating.

According to another aspect of the present disclosure, wherein in deploying the infrastructure package, the processor may be further configured to: copy the package artifact to the central repository; register the infrastructure package in the central repository; and execute the user defined code on the package artifact after at least one of the copying and the registering.

According to yet another aspect of the present disclosure, wherein in managing the infrastructure package, the processor may be further configured to: download the infrastructure package from the central repository; validate the infrastructure package; perform a management action; and execute the user defined code on the downloaded infrastructure package after at least one of the validating and the performing the management action.

According to a further aspect of the present disclosure, a non-transitory computer readable medium configured to store instructions for creating Infrastructure as Code ("IaC") templates in a cloud environment is disclosed. The instructions, when executed, may cause a processor to perform the following: creating, by the processor, a plurality of IaC templates, each of the plurality of IaC templates including instructions to build at least a portion of an infrastructure; storing, by the processor, the plurality of IaC templates in a central repository; collecting, by the processor; one or more of the plurality of the created IaC templates from the central repository in order to build a desired infrastructure package; and executing at least one of updating removing, upgrading, and verifying, by the processor, the infrastructure package in the central repository, wherein each of the plurality of IaC templates comprises metadata identifying at least one of an infrastructure package, installation instructions of the infrastructure package, at least one dependency of the infrastructure package, a version of the infrastructure package, and a size of the infrastructure package.

According to another aspect of the present disclosure, wherein when executed, the instructions may further cause the processor to perform the following: defining an infrastructure package for IaC; building the infrastructure package by collecting one or more of the plurality of the created IaC templates from the central repository; deploying the infrastructure package; and managing the infrastructure package.

According to yet another aspect of the present disclosure, wherein in defining the infrastructure package, the instructions, when executed, may further cause the processor to perform the following: creating a configuration of the infrastructure package; validating the configuration of the infrastructure package; and executing a user-defined code within the infrastructure package.

According to an additional aspect of the present disclosure, wherein in building the infrastructure package, the instructions, when executed, further cause the processor to perform the following: collecting specific files; processing the collected specific files to create at least one package artifact; and executing the user defined code on the collected specific files after at least one of the collecting, the processing and the creating.

According to a further aspect of the present disclosure, wherein in deploying the infrastructure package, the instructions, when executed, further cause the processor to perform the following: copying the package artifact to the central repository; registering the infrastructure package in the central repository; and executing the user defined code on the package artifact after at least one of the copying and the registering.

According to another aspect of the present disclosure, wherein in managing the infrastructure package, the instructions, when executed, further cause the processor to perform the following: downloading the infrastructure package from the central repository; validating the infrastructure package; performing a management action; and executing the user defined code on the downloaded infrastructure package after at least one of the validating and the performing the management action.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
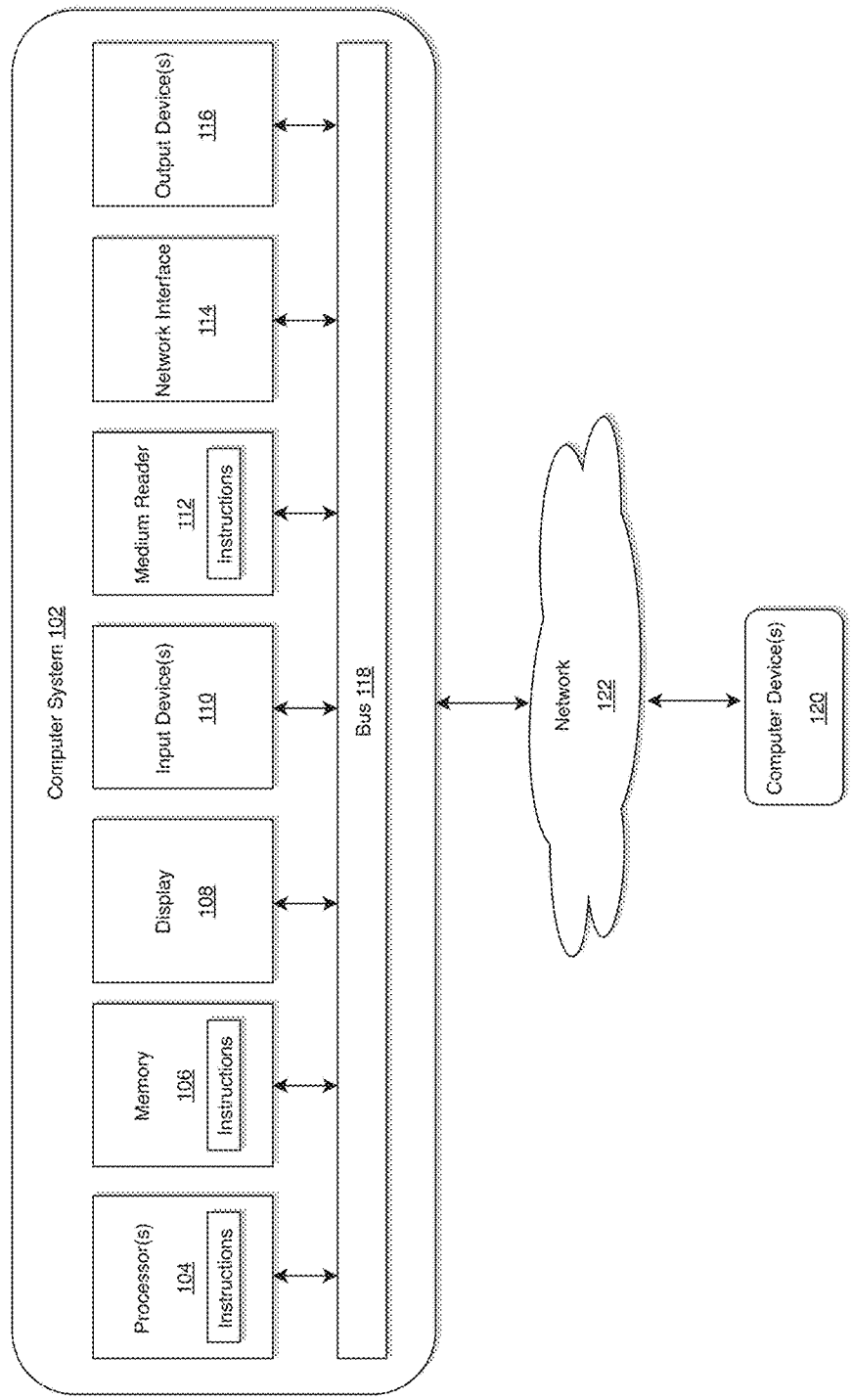
FIG. 1 illustrates a computer system for providing IaC templates in a cloud environment, according to an example embodiment

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units, devices and/or modules. Those skilled in the art will appreciate that these blocks, units, devices, and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units, devices, and/or modules being implemented by microprocessors or similar, they may be programmed using software (e.g., microcode) to perform various functions discussed herein and may optionally be driven by firmware and/or software. Alternatively, each block, unit, device, and/or module may be implemented by dedicated hardware, or as a combination of dedicated hardware to perform some functions and a processor (e.g., one or more programmed microprocessors and associated circuitry) perform other functions. Also, each block, unit, device, and/or module of the example embodiments may be physically separated into two or more interacting and discrete blocks, units, devices, and/or modules without departing from the scope of the inventive concepts. Further, the blocks, units, devices, and/or modules of the example embodiments may be physically combined into more complex blocks, units, devices, and/or modules without departing from the scope of the present disclosure.

Analogous to how developers package unit tests with their application code, development team members can write infrastructure automated tests to validate that the IaC is setup correctly. Teams write tests that ascertain that aspects about the newly created environment are true. Typically, this includes validating the software that is installed, the location where the software is installed, which persons have access to the software, whether the software is currently running and how the software is configured. The infrastructure test code is versioned with the infrastructure code forming a matched pair. Once versioned alongside the rest of the application, these infrastructure tests can then be run as part of the continuous integration process. Accordingly, packaging LC helps traditionally bottlenecked and silo-ed infrastructure teams to work more closely with the application teams and to improve overall business agility. Development team members write infrastructure code alongside the application under development, all leveraging popular development practices including code management, continuous integration, release automation and test-driven development.

For example, packaging infrastructure as code provides the ability to install, re-install, remove, upgrade and verify packages via the user of package management tools to perform these functions. Achieving the standard process also includes using a database of installed packages to query and verify packages by maintaining a database of installed packages and their files, which allows users to easily query and verity packages on their system. Achieving the standard process further includes using metadata to describe packages and their installation instructions, where the metadata describes the related package's components, dependencies, versions, release, size, project URL, installation instructions, and the like. Achieving the standard process may also include adding packages to a central repository to enable clients to easily find and deploy the packages. Accordingly, the central repository may include a number of packages available for download by a user seeking to build an infrastructure. Achieving the standard process also includes digitally signing the packages by using, for example, a digital signing key, so that users are able to verify the authenticity of the package. Achieving the standard process also includes automatically managing dependency of a package, so that when a package is installed, dependent packages are automatically installed as well. As a result, with this technology, it becomes possible to improve existing software development life cycles used for cloud infrastructure development.

FIG. 1 is an example system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at east one processor 104. The processor 104 is tangible and non-transitory. As used herein, the term "non-transitory" is to be interpreted not as an eternal characteristic of a state, but as a characteristic of a state that last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory electrically programmable read only memory (EPROM), electrically erasable, programmable read-only memory (EEPROM), registers, a hard disk, a cache, a removable disk, tape, compact disk read only memory (CD-ROM), digital versatile disk (DVD), floppy disk, bluray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

Figure 2:
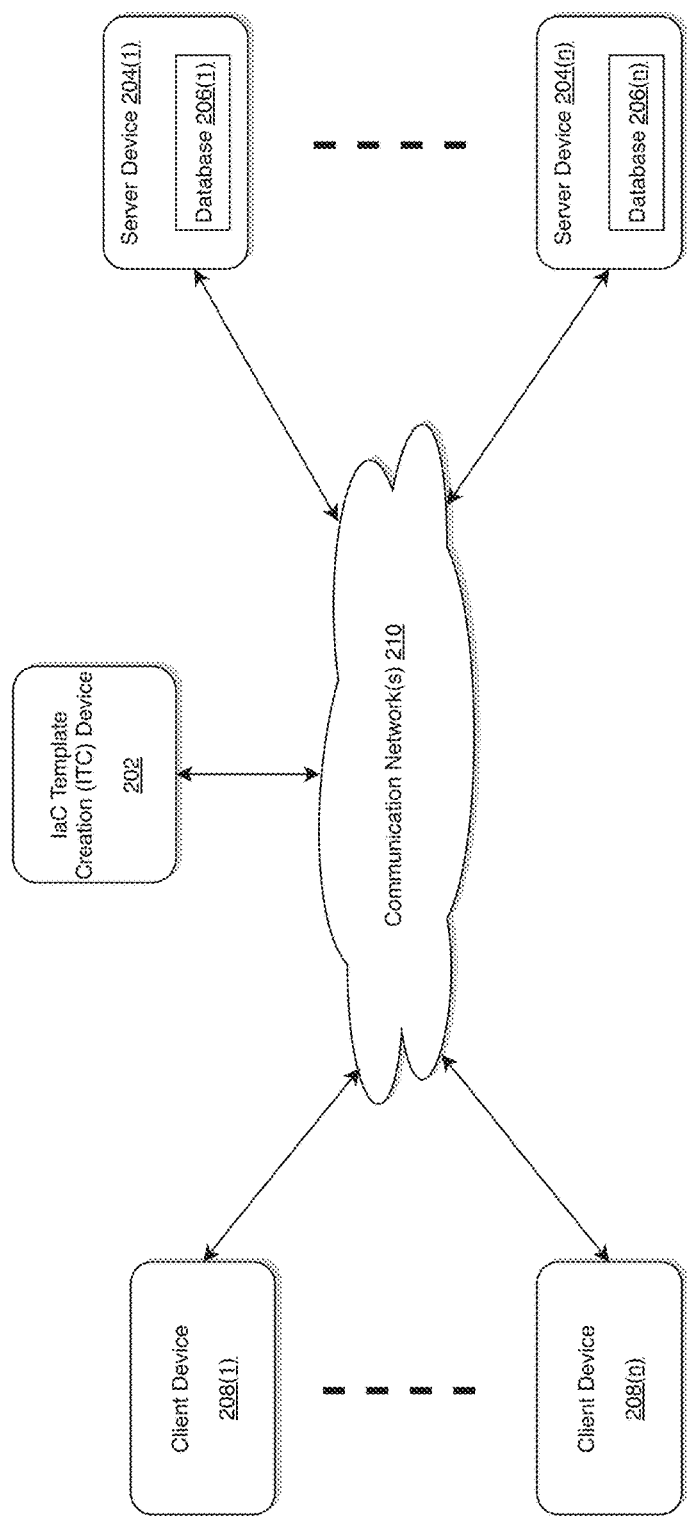
FIG. 2 illustrates a diagram of a network environment for providing IaC templates in a cloud environment, according to an example embodiment.

Referring to FIG. 2, a schematic of an exemplary network environment 200 for implementing packaging infrastructure as code is illustrated. In an exemplary embodiment, the standard template creation framework is executable on any networked computer platform, such as, for example, a wireless mobile communication device, i.e., a smart phone.

Packaging infrastructure as code may be implemented by an IaC Template Creation (ITC) device 202. The ITC device 202 may be the same or similar to the computer system 102 as described with respect to FIG. 1. The ITC device 202 may store one or more applications that can include executable instructions that, when executed by the ITC device 202, cause the ITC device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the ITC device 202 itself, may be located in virtual server(s) running in a cloud-based computing environment rather than being tied to one or more specific physical network computing devices. Also, the application(s) may be running in one or more virtual machines (VMs) executing on the ITC device 202. Additionally, in one or more embodiments of this technology, virtual machine(s) running on the ITC device 202 may be managed or supervised by a hypervisor.

In the network environment 200 of FIG. 2, the ITC device 202 is coupled to a plurality of server devices 204(1)-204(n) that hosts a plurality of databases 206(1)-206(n), and also to a plurality of client devices 208(1)-208(n) via communication network(s) 210. A communication interface of the ITC device 202, such as the network interface 114 of the computer system 102 of FIG. 1, operatively couples and communicates between the ITC device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the ITC device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and AST devices that efficiently automatically enable and disable a purchase card for attempted transactions.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The ITC device 202 may be a standalone device or integrated with one or more other devices or apparatuses, such as one or more of the server devices 204(1)-204(n), for example. In one particular example, the ITC device 202 may include or be hosted by one of the server devices 204(1)-204(n), and other arrangements are also possible. Moreover, one or more of the devices of the ITC device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the ITC device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store template data, package building data, and package deployment data that relates to the standard template creation framework.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. In example embodiments, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the ITC device 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the ITC device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the ITC device 202, the server devices 204(1)-204(n), or the client devices 208(1)-208(n), for example, may be configured to operate as virtual instances on the same physical machine. In other words, one or more of the ITC device 202, the server devices 204(1)-204(n), or the client devices 208(1)-208(n) may operate on the same physical device rather than as separate devices communicating through communication network(s) 210. Additionally, there may be more or fewer ITC devices 202, server devices 204(1)-204(n), or client devices 208(1)-208 (n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
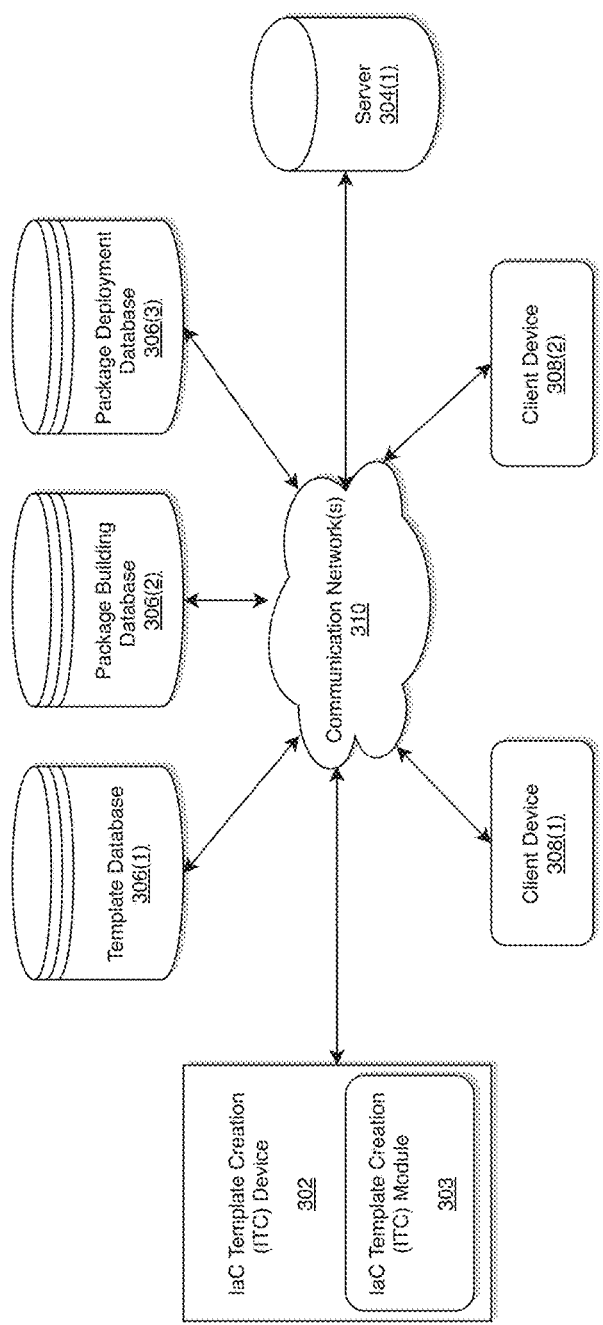
FIG. 3 shows a system for providing IaC templates in a cloud environment with an IaC Template Creation Module, according to an example embodiment

As illustrated in FIG. 3, the system 300 may include an ITC device 302 that includes an ITC module 303; a template database 306(1), a package database 306(2), a package deployment database 306(3), a server 304(1), a first client device 308(1), and a second client device 308(2) interconnected with each other via a communication network(s) 310. The ITC device 302 is described and shown in FIG. 3 as including an IaC Template Creation Module ("ITCM") 303, although it may include other rules, policies, modules, databases, or applications, for example. As will be described below, the ITCM 303 is configured to establishing a standard way to build, package, version and deploy IaC templates. According to exemplary embodiments, the ITC device 302 may be the same or similar to the ITC device 202 as illustrated in FIG. 2. According to exemplary embodiments, the first client device 308(1) and the second client device 308(2) may be the same or similar to the first client device 208(1) and the second client device 208(2), respectively, as illustrated in FIG. 2. Also, according to exemplary embodiments, the server 304(1) may be the same or similar to the server 204(1) as illustrated in FIG. 2, and the communication network(s) 310 may be the same or similar to the communication networks(s) 210 as illustrated in FIG. 2.

An exemplary process 300 for implementing a standard template creation framework for a service by utilizing the network environment of FIG. 2 is shown as being executed in FIG. 3. Specifically, a first client device 308(1) and a second client device 308(2) are illustrated as being in communication with ITC device 302. In this regard, the first client device 308(1) and the second client device 308(2) may be "clients" of the ITC device 302 and are described herein as such. Nevertheless, it is to be known and understood that the first client device 308(1) and/or the second client device 308(2) need not necessarily be "clients" of the ITC device 302, or any entity described in association therewith herein. Any additional or alternative relationship may exist between either or both of the first client device 308(1) and the second client device 308(2) and the ITC device 302, or no relationship may exist.

Further, ITC device 302 is illustrated as being able to access a template database 306(1), a package building database 306(2), and a package deployment database 306(3) via the communication network(s) 310. According to exemplary embodiments, the ITCM 303 may also be configured to access these databases for implementing a standard template creation framework for a service.

The first client device 308(1) may be, for example, a smart phone. Of course, the first client device 308(1) may be any additional device described herein. The second client device 308(2) may be, for example, a personal computer (PC). Of course, the second client device 308(2) may also be any additional device described herein.

The process may be executed via the communication network(s) 310, which may comprise plural networks as described above. For example, in an exemplary embodiment, either or both of the first client device 308(1) and the second client device 308(2) may communicate with the ITC device 302 via broadband or cellular communication. Of course, these embodiments are merely exemplary and are not limiting or exhaustive.

Upon being started, the ITCM 303 executes a process for packaging IaC. Specifically, an example process for implementing IaC templates in a cloud environment, according to an example embodiment, is generally indicated at flowchart 400 in FIG. 4.

Figure 4:
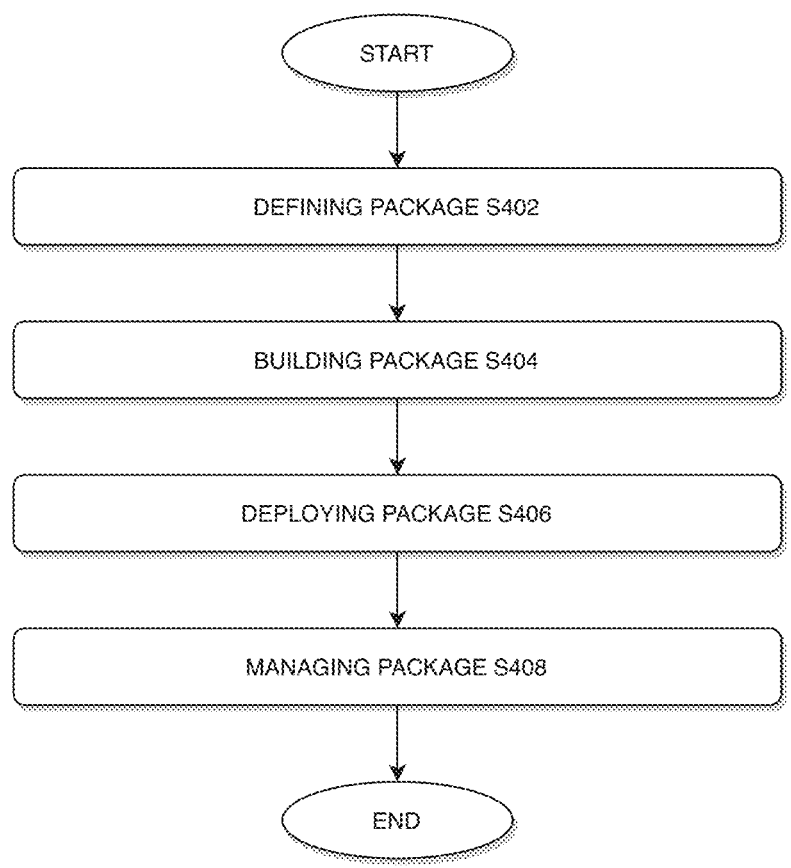
FIG. 4 is a flowchart of a process for packaging IaC, according to an example embodiment.

In example embodiments illustrated in the process 400 of FIG. 4, while executing the web application, at step S402, the ITCM 303 defines the package of the IaC. In embodiments, the package is a file that includes tools or instructions, also referred to as templates, necessary to have the code operate properly to build an infrastructure such as, for example, a cloud-based infrastructure. For example, a package typically includes the IaC as well as some information sufficient to setup and configure the IaC. In example embodiments, at step S402, the ITCM 303 creates a configuration of the package, the configuration including templates necessary to build the infrastructure, and metadata which may describe the package's purpose, dependencies with other packages, version, release, size, project URL, installation instructions, and the like. In embodiments, the ITCM 303 provides plug mechanisms into various phases of the package lifecycle to provide users with custom code that is executed and that augments default behavior. For example, the ITCM 303 provides templates configured to build basic infrastructure portions and that can be plugged in to facilitate building the totality of the infrastructure. In example embodiments, the ITCM 303 may also perform dependency resolution to identify any package(s), if any, are dependent from the package being configured. In embodiments, the dependencies of the package are other dependent packages so that, when the package is installed, the dependent packages are also automatically installed.

Example embodiments include a process for providing IaC templates. As discussed above, the configuration includes templates necessary to build the infrastructure. In embodiments, the templates are written in the declarative style of infrastructure as code. In embodiments, an IaC template includes user-specified resources or instructions necessary to build one or more portions of the infrastructure, for example, a web server, a database, and/or a load balancer. Templates can be constructed as a set of layers of resources, constituting a stack. In embodiments, because a template is stored in a central repository, the template can be reviewed, corrected, updated, or otherwise used to verify that the resulting infrastructure is properly described.

In example embodiments, at step S404, the ITCM 303 builds the package of the IaC. In example embodiments, the ITCM 303 collects specific files to bring together in order to form the package for the purpose of building a given infrastructure. For example, the specific files may include the templates for building the package, the templates including instructions for a server to perform a desired function to build the given infrastructure. In embodiments, the specific files may also include information relative to the infrastructure components such as, for example, one or more servers, one or more databases or a load balancer. In example embodiments, the ITCM 303 tests the IaC by executing a user-defined code on the specific files in order to ascertain that the IaC correctly interacts with the specific files. The user-defined code may be a template. In example embodiments, the ITCM 303 processes the collected specific files by using the specific files to create the stack of layers of resources. In example embodiments, the ITCM 303 executes the user-defined code on the created stack in order to ascertain that the created stack corresponds to the intended infrastructure. In example embodiments, the ITCM 303 creates a package artifact. In embodiments, the package artifact is the result of an intermediary build phase of the intended infrastructure by the IaC, and may be a portion of the infrastructure to be built. In example embodiments, the ITCM 303 executes the user-defined code on the package artifact order to ascertain that the package artifact corresponds to the intended infrastructure.

In example embodiments, the ITCM 303 validates the configuration of package by testing the instructions in the user-defined code included in the package and ascertaining that the package includes the correct instructions to build the desired infrastructure. In example embodiments, after validating the configuration, the ITCM 303 executes the user-defined code within the package to determine whether the package performs as desired by providing the compiled instructions necessary to build the desired infrastructure.

At step S406, the ITCM 303 deploys the package of the IaC. In example embodiments, the ITCM 303 first copies the package, or the package artifact, to the central repository. In example embodiments, the ITCM 303 registers the package in the central repository. In example embodiments, the ITCM 303 executes the user-defined code when copying the package or package artifact and/or registering the package or package artifact. In embodiments, as a result of the deployment of the package of the IaC, the infrastructure is built.

At step S408, the ITCM 303 manages the package of the IaC. In example embodiments, the ITCM 303 downloads the package from the central repository. For example, the ITCM 303 downloads the package from the central repository at various intervals. In embodiments, the ITCM 303 validates the downloaded package by ascertaining that the downloaded package is not corrupted. In example embodiments, the ITCM 303 performs a management action such as, for example, an update of the package, or other action, in order to maintain the integrity and the functionality of the package throughout the deployment thereof.

Figure 4A:
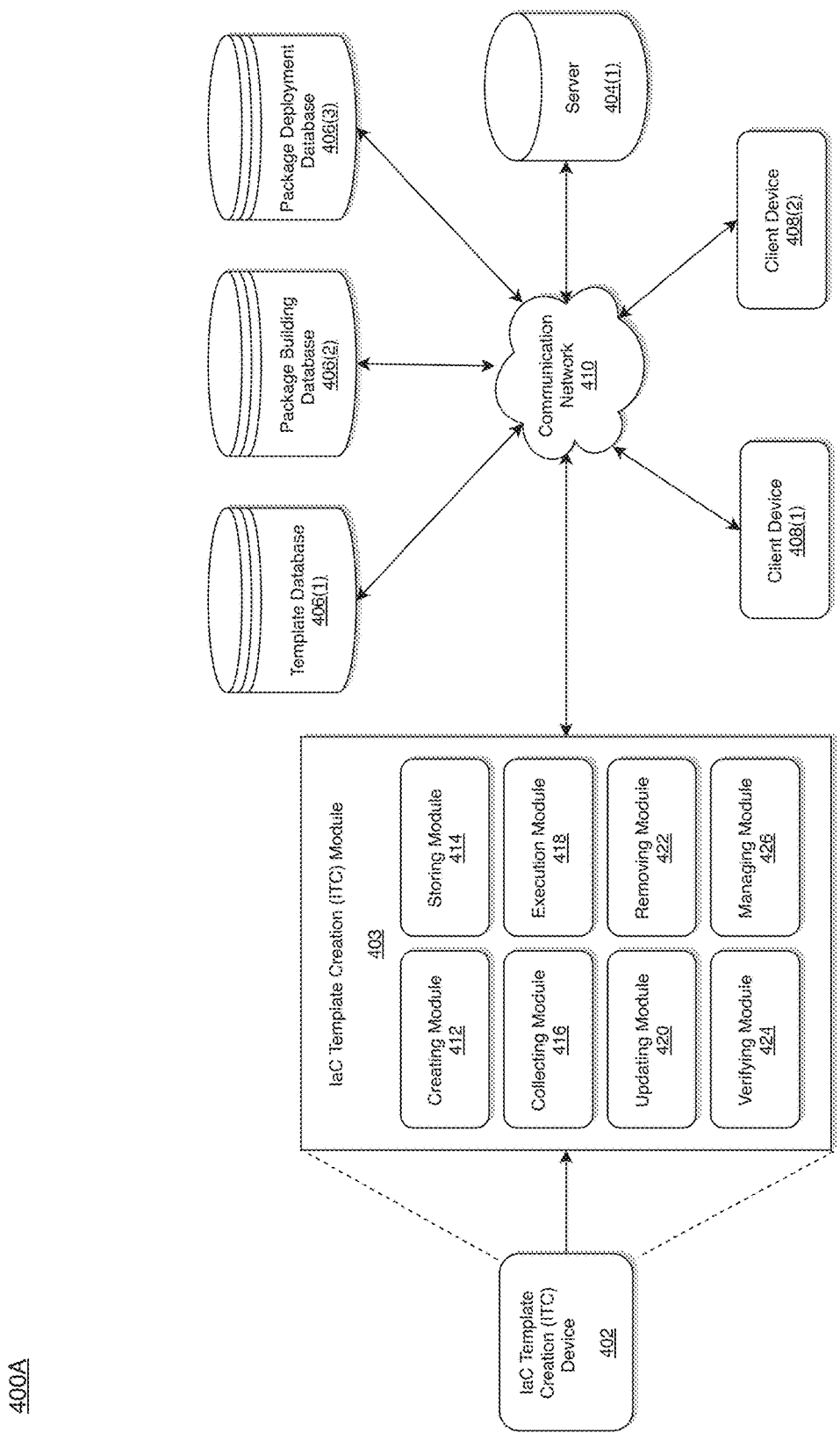
FIG. 4A illustrates a system diagram for implementing an IaC Template Creation Module of FIG. 3 in accordance with an exemplary embodiment.

FIG. 4A illustrates further details of the ITCM 303 of FIG. 3. For example, as illustrated in FIG. 4A, the system 400A may include an ITC device 402 that includes an ITC module 403; a template database 406(1), a package database 406(2), a package deployment database 406(3), a server 404(1), a first client device 408(1), and a second client device 408(2) interconnected with each other via a communication network(s) 410. The IaC device 402 is described and shown in FIG. 4A as including an IaC Template Creation Module ("ITCM") 403, although it may include other rules, policies, modules, databases, or applications, for example. As will be described below, the ITCM 403 is configured to establishing a standard way to build, package, version and deploy IaC templates. According to exemplary embodiments, the ITC device 402 may be the same or similar to the ITC device 302 as illustrated in FIG. 3. According to exemplary embodiments, the first client device 408(1) and the second client device 408(2) may be the same or similar to the first client device 308(1) and the second client device 308(2), respectively, as illustrated in FIG. 3. Also, according to exemplary embodiments, the server 404(1) may be the same or similar to the server 304(1) as illustrated in FIG. 3, and the communication network(s) 410 may be the same or similar to the communication networks(s) 310 as illustrated in FIG. 3.

As illustrated in FIG. 4A, the ITC module 403 may include a creating module 412, a storing module 414, a collecting module 416, an executing module 418, an updating module 420, a removing module 422, a verifying module 424, and a managing module 426.

According to exemplary embodiments, each of the creating module 412, storing module 414, collecting module 416, executing module 418, updating module 420, removing module 422, verifying module 424, and the managing module 426 may be implemented by microprocessors or similar, they may be programmed using software (e.g., microcode) to perform various functions discussed herein and may optionally be driven by firmware and/or software. Alternatively, each of the creating module 412, storing module 414, collecting module 416, executing module 418, updating module 420, removing module 422, verifying module 424, and the managing module 426 may be implemented by dedicated hardware, as a combination of dedicated hardware to perform some functions and a processor (e.g., one or more programmed microprocessors and associated circuitry) to perform other functions. Also, according to exemplary embodiments, each of the creating module 412, storing module 414, collecting module 416, executing module 418, updating module 420, removing module 422, verifying module 424, and the managing module 426 may be physically separated into two or more interacting and discrete blocks, units, devices, and/or modules without departing from the scope of the inventive concepts. Further, each of the creating module 412, storing module 414, collecting module 416, executing module 418, updating module 420, removing module 422, verifying module 424, and the managing module 426 may be physically combined into more complex blocks, units, devices, and/or modules without departing from the scope of the present disclosure.

According to exemplary embodiments, the creating module 412 may be configured to create a plurality of IaC templates, each of the plurality of IaC templates including instructions to build at least a portion of an infrastructure. The storing module 414 may be configured to store the plurality of IaC templates in a central repository (i.e., server 404(1)). The collecting module 416 may be configured to collect one or more of the plurality of the created IaC templates from the central repository in order to build a desired infrastructure package. The execution module 418 may be configured to execute at least one of updating, removing, upgrading, and verifying the infrastructure package in the central repository.

For example, the updating module 420 may be configured to update the infrastructure package in the central repository; removing module 422 may be configured to remove the infrastructure package from the central repository; the verifying module 424 may be configured to verify the infrastructure package in the central repository and the managing module 426 may be configured to implement any desired managing actions associated with the infrastructure package in the central repository. According to exemplary embodiments, the updating module 420 may further be configured to upgrade or downgrade the infrastructure package in the central repository based on received instructions.

According to exemplary embodiments, the ITCM 403 may be further configured to: define the desired infrastructure package for IaC; build the desired infrastructure package by collecting one or more of the plurality of the created IaC templates from the central repository; deploy the desired infrastructure package; and manage the desired infrastructure package.

According to exemplary embodiments, in defining the infrastructure package, the creating module 412 may be configured to create a configuration of the infrastructure package; and the verifying module 424 may be configured to validate the configuration of the infrastructure package; and the execution module 422 may be configured to execute a user-defined code within the infrastructure package. According to exemplary embodiments, in defining the infrastructure package, the ITCM 403 may be configured to describe different attributes or different properties of the infrastructure package, i.e., its maintainer, its version, where it is located (i.e., source control), what is able to do, etc., but the disclosure is not limited thereto.

According to exemplary embodiments, in building the infrastructure package, the collecting module 416 may be configured to collect specific files; and the execution module 418 may be further configured to process the collected specific files to create at least one package artifact; and execute the user defined code on the collected specific files after at least one of the collecting, the processing and the creating.

According to exemplary embodiments, in deploying the infrastructure package, the ITCM 403 may be further configured to: copy the package artifact to the central repository; register the infrastructure package in the central repository; and execute the user defined code on the package artifact after at least one of the copying and the registering via the execution module 418.

According to exemplary embodiments, in managing the infrastructure package, the managing module 426 may be further configured to: download the infrastructure package from the central repository via the collecting module 416; validate the infrastructure package via the verifying module 424; perform a management action; and execute, via the execution module 418, the user defined code on the downloaded infrastructure package after at least one of the validating and the performing the management action.

Figure 5:
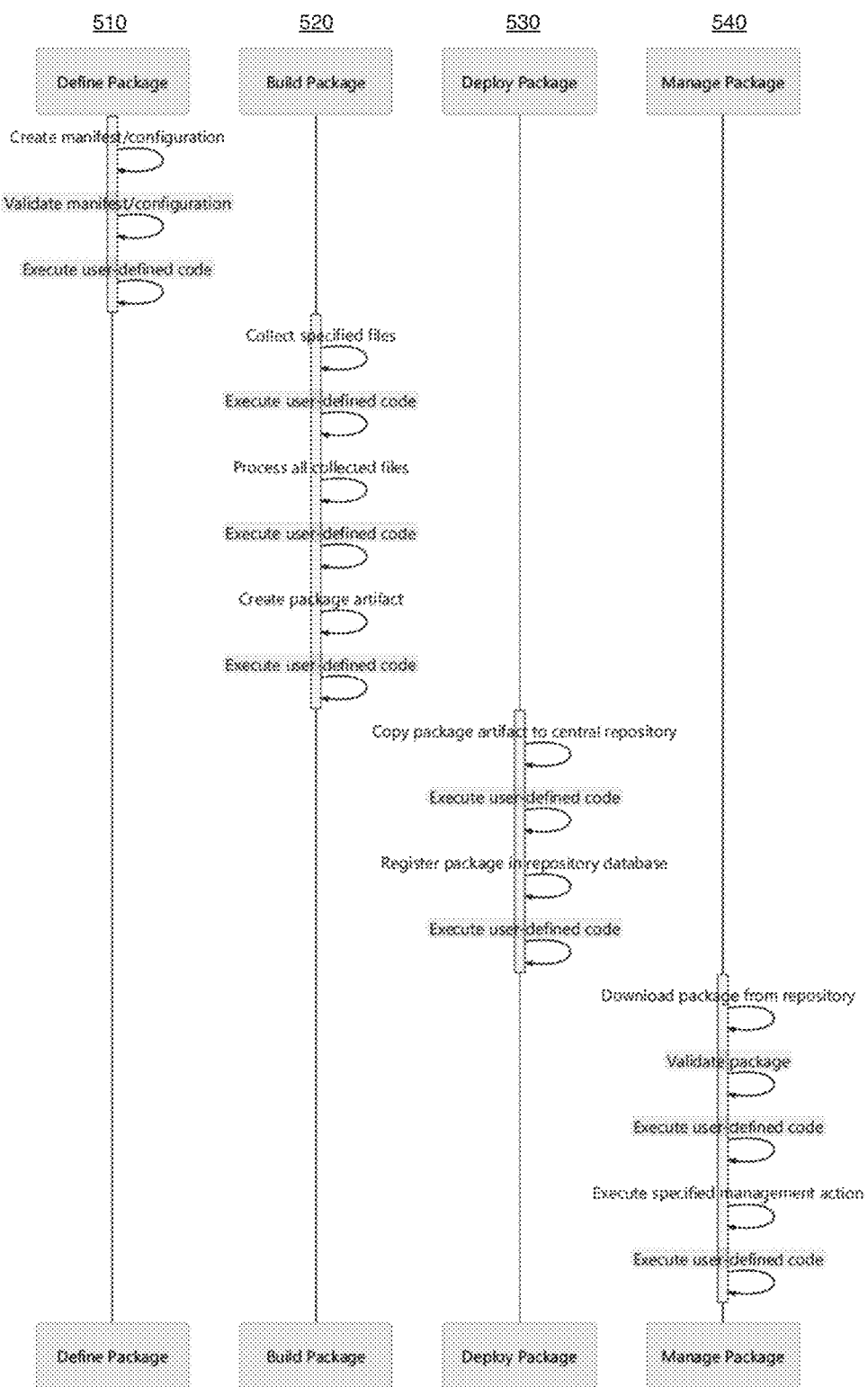
FIG. 5 illustrates a diagram for packaging IaC, according to an example embodiment.

FIG. 5 illustrates a diagram illustrating the packaging of an IaC, according to an example embodiment. The diagram in FIG. 5 describes defining the package at 510, building the package at 520, deploying the package to build infrastructure at 530, and managing the package at 540.

In example embodiments, defining the package at 510 includes defining a file that includes tools and/or instructions necessary to properly to build an infrastructure such as, for example, a cloud-based infrastructure. For example and with reference to FIGS. 3 and 4A, the ITCM 303 or the ITCM 403 creates a configuration of the package. As part of defining the package at 510, in example embodiments, the ITCM 303 or the ITCM 403 validates the configuration of the package by testing the instructions in a user-defined code included in the package to ascertain that the package includes the correct instructions to build the desired infrastructure. In example embodiments, after validating the configuration, the ITCM 303 or the ITCM 403 executes the user-defined code that defines the desired infrastructure to determine whether the package performs as desired by providing the compiled instructions necessary to build the desired infrastructure.

In example embodiments, building the package at 520 includes collecting specific files to bring together in order to form the package, the specific files including templates for building the package as well as information relative to the infrastructure components such as, e.g., a server, a database and a load balancer. At 520, the ITCM 303 or the ITCM 403 executes the user-defined code on the collected specific files and creates the stack of layers of resources including instructions to build the desired infrastructure. At 520, the ITCM 303 or the ITCM 403 may also create a package artifact, and may execute the user-defined code on the package artifact. In example embodiments, deploying the package at 520 includes copying and registering the package artifact to the central repository, and executing the user-defined code on the package artifact.

In example embodiments, deploying the package at 530 includes copying and registering the package to the central repository, and executing the user-defined code. In example embodiments, the ITCM 303 or the ITCM 403 executes the user-defined code on the package or package artifact to compile the information necessary to build the desired infrastructure. In embodiments, as a result of the deployment of the package of the IaC, the infrastructure is built.

In example embodiments, managing the package at 540 includes downloading the package from the central repository and validating the downloaded package to ascertain that the downloaded package, e.g., is not corrupted. In example embodiments, managing the package also includes performing a management action such as an update of the package, or other action, in order to maintain the integrity and the functionality of the package throughout the deployment thereof.

Accordingly, with this technology, it becomes possible to establish a standard process in which to build, package, version and deploy IaC templates in a cloud environment, and the standard process is repeatable by any user that uses that IaC. This advantage eliminates, or reduces, configuration drift.

Figure 6:
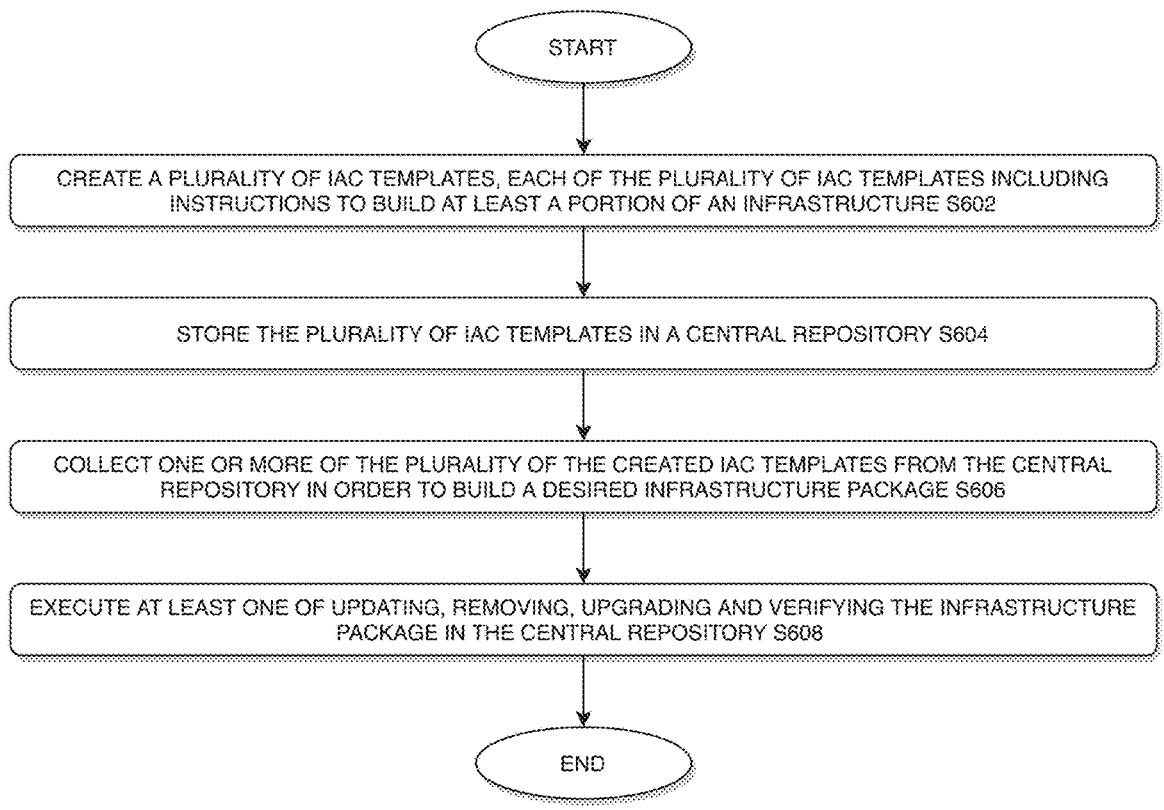
FIG. 6 illustrates another flowchart of a process for packaging IaC, according to an example embodiment.

FIG. 6 illustrates another flowchart of a process 600 for packaging IaC, according to an example embodiment.

For example, at step S602, the process 600 may create a plurality of IaC templates. Each of the plurality of LC templates including instructions to build at least a portion of an infrastructure, At step S604, the process 600 may store the plurality of LC templates in a central repository. At step S606, the process 600 may collect one or more of the plurality of the created IaC templates from the central repository in order to build a desired infrastructure package. At step S608, the process 600 may execute at least one of updating, removing, upgrading, and verifying the infrastructure package in the central repository.

According to exemplary embodiments, the process 600 may include: defining an infrastructure package for IaC; building the infrastructure package by collecting one or more of the plurality of the created IaC templates from the central repository; deploying the infrastructure package; and managing the infrastructure package.

According to exemplary embodiments, in defining the infrastructure package, the process 600 may further include: creating a configuration of the infrastructure package; validating the configuration of the infrastructure package; and executing a user-defined code within the infrastructure package.

According to exemplary embodiments, in building the infrastructure package, the process 600 may further include: collecting specific files; processing the collected specific files to create at least one package artifact; and executing the user defined code on the collected specific files after at least one of the collecting, the processing and the creating.

According to exemplary embodiments, in deploying the infrastructure package, the process 600 may further include: copying the package artifact to the central repository; registering the infrastructure package in the central repository; and executing the user defined code on the package artifact after at least one of the copying and the registering.

According to exemplary embodiments, in managing the infrastructure package, the process 600 may further include: downloading the infrastructure package from the central repository; validating the infrastructure package; performing a management action; and executing the user defined code on the downloaded infrastructure package after at least one of the validating and the performing the management action.

According to exemplary embodiments, a non-transitory computer readable medium may be configured to store instructions for creating Infrastructure as Code ("IaC") templates in a cloud environment. According to exemplary embodiments, the instructions, when executed, may cause a processor embedded within the ITC device 402 or the ITCM 403 to perform the following: creating, by the processor, a plurality of IaC templates, each of the plurality of IaC templates including instructions to build at least a portion of an infrastructure; storing, by the processor, the plurality of IaC templates in a central repository; collecting, by the processor, one or more of the plurality of the created IaC templates from the central repository in order to build a desired infrastructure package; and executing at least one of updating, removing, upgrading, and verifying, by the processor, the infrastructure package in the central repository. Each of the plurality of IaC templates may include metadata identifying at least one of an infrastructure package, installation instructions of the infrastructure package, at least one dependency of the infrastructure package, a version of the infrastructure package, and a size of the infrastructure package. The processor may be the same or similar to the processor 104 as illustrated in FIG. 1 or the processor embedded within ITC device 202, ITC device 302, ITCM 303, ITC device 402, and ITCM 403.

According to exemplary embodiments, wherein when executed, the instructions may further cause the processor 104 to perform the following: defining an infrastructure package for IaC; building the infrastructure package by collecting one or more of the plurality of the created IaC templates from the central repository; deploying the infrastructure package; and managing the infrastructure package.

According to exemplary embodiments, wherein in defining the infrastructure package, the instructions, when executed, may further cause the processor 104 to perform the following: creating a configuration of the infrastructure package; validating the configuration of the infrastructure package; and executing a user-defined code within the infrastructure package.

According to exemplary embodiments, wherein in building the infrastructure package, the instructions, when executed, further cause the processor 104 to perform the following: collecting specific files; processing the collected specific files to create at least one package artifact; and executing the user defined code on the collected specific files after at least one of the collecting, the processing and the creating.

According to exemplary embodiments, wherein in deploying the infrastructure package, the instructions, when executed, further cause the processor 104 to perform the following: copying the package artifact to the central repository; registering the infrastructure package in the central repository; and executing the user defined code on the package artifact after at least one of the copying and the registering.

According to exemplary embodiments, wherein in managing the infrastructure package, the instructions, when executed, further cause the processor 104 to perform the following: downloading the infrastructure package from the central repository; validating the infrastructure package; performing a management action; and executing the user defined code on the downloaded infrastructure package after at least one of the validating and the performing the management action.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular processes, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory (RAM) or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing to the present application should be interpreted as being implemented or implementable solely with software and not hardware.

Although the present specification describes components and functions that may be implemented in example embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of the entirety of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for providing Infrastructure as Code ("IaC") templates in a cloud environment, the method being implemented by a processor on a computing device, the method comprising:

creating, by the processor, a plurality of IaC templates, each of the plurality of IaC templates including instructions to build at least a portion of an infrastructure;

storing, by the processor, the plurality of IaC templates in a central repository, including versioning the plurality of IaC templates;

collecting, by the processor, one or more of the plurality of the created IaC templates from the central repository in order to build a desired infrastructure package; and executing at least one of updating, removing, upgrading, and verifying, by the processor, the infrastructure package in the central repository, wherein each of the plurality of IaC templates comprises metadata identifying at least one of an infrastructure package, installation instructions of the infrastructure package, at least one dependency of the infrastructure package, a version of the infrastructure package, and a size of the infrastructure package, and the method further comprising:

defining an infrastructure package for IaC, building the infrastructure package by collecting one or more of the plurality of the created IaC templates from the central repository;
deploying the infrastructure package; and
managing the infrastructure package.

2. The method of claim 1, wherein defining the infrastructure package further comprising:
creating a configuration of the infrastructure package;
validating the configuration of the infrastructure package; and
executing a user-defined code within the infrastructure package.

3. The method of claim 2, wherein building the infrastructure package further comprising:
collecting specific files;
processing the collected specific files to create at least one package artifact; and
executing the user defined code on the collected specific files after at least one of the collecting, the processing and the creating.

4. The method of claim 3, wherein deploying the infrastructure package further comprising:
copying the package artifact to the central repository;
registering the infrastructure package in the central repository; and
executing the user defined code on the package artifact after at least one of the copying and the registering.

5. The method of claim 4, wherein managing the infrastructure package further comprising:
downloading the infrastructure package from the central repository;
validating the infrastructure package;
performing a management action; and
executing the user defined code on the downloaded infrastructure package after at least one of the validating and the performing the management action.

6. A system for providing Infrastructure as Code ("IaC") templates in a cloud environment, comprising:
a memory and a processor operatively connected to the memory via a communication network,
wherein the processor is configured to:
create a plurality of IaC templates, each of the plurality of IaC templates including instructions to build at least a portion of an infrastructure;
store the plurality of IaC templates in a central repository, including versioning the plurality of IaC templates;
collect one or more of the plurality of the created IaC templates from the central repository in order to build a desired infrastructure package; and
execute at least one of updating, removing, upgrading, and verifying the infrastructure package in the central repository,
wherein each of the plurality of IaC templates comprises metadata identifying at least one of an infrastructure package, installation instructions of the infrastructure package, at least one dependency of the infrastructure package, a version of the infrastructure package, and a size of the infrastructure package and
wherein the processor is further configured to:
define the desired infrastructure package for IaC,
build the desired infrastructure package by collecting one or more of the plurality of the created IaC templates from the central repository;
deploy the desired infrastructure package; and
manage the desired infrastructure package.

7. The system of claim 6, wherein in defining the infrastructure package, the processor is further configured to:
create a configuration of the infrastructure package;
validate the configuration of the infrastructure package; and
execute a user-defined code within the infrastructure package.

8. The system of claim 7, wherein in building the infrastructure package, the processor is further configured to:
collect specific files;
process the collected specific files to create at least one package artifact; and
execute the user defined code on the collected specific files after at least one of the collecting, the processing and the creating.

9. The system of claim 8, wherein in deploying the infrastructure package, the processor is further configured to:
copy the package artifact to the central repository;
register the infrastructure package in the central repository; and
execute the user defined code on the package artifact after at least one of the copying and the registering.

10. The system of claim 9, wherein in managing the infrastructure package, the processor is further configured to:
download the infrastructure package from the central repository;
validate the infrastructure package;
perform a management action; and
execute the user defined code on the downloaded infrastructure package after at least one of the validating and the performing the management action.

11. A non-transitory computer readable medium configured to store instructions for creating Infrastructure as Code ("IaC") templates in a cloud environment, wherein when executed, the instructions cause a processor to perform the following:
creating, by the processor, a plurality of IaC templates, each of the plurality of IaC templates including instructions to build at least a portion of an infrastructure;
storing, by the processor, the plurality of IaC templates in a central repository, including versioning the plurality of IaC templates;
collecting, by the processor, one or more of the plurality of the created IaC templates from the central repository in order to build a desired infrastructure package; and
executing at least one of updating, removing, upgrading, and verifying, by the processor, the infrastructure package in the central repository,
wherein each of the plurality of IaC templates comprises metadata identifying at least one of an infrastructure package, installation instructions of the infrastructure package, at least one dependency of the infrastructure package, a version of the infrastructure package, and a size of the infrastructure package, and
wherein when executed, the instructions further cause the processor to perform the following:
defining an infrastructure package for IaC,
building the infrastructure package by collecting one or more of the plurality of the created IaC templates from the central repository;
deploying the infrastructure package; and
managing the infrastructure package.

12. The non-transitory computer readable medium of claim 11, wherein in defining the infrastructure package, the instructions, when executed, further cause the processor to perform the following:

creating a configuration of the infrastructure package;

validating the configuration of the infrastructure package; and executing a user-defined code within the infrastructure package.

13. The non-transitory computer readable medium of claim 12, wherein in building the infrastructure package, the instructions, when executed, further cause the processor to perform the following:

collecting specific files;

processing the collected specific files to create at least one package artifact; and executing the user defined code on the collected specific files after at least one of the collecting, the processing and the creating.

14. The non-transitory computer readable medium of claim 13, wherein in deploying the infrastructure package, the instructions, when executed, further cause the processor to perform the following:

copying the package artifact to the central repository;

registering the infrastructure package in the central repository; and executing the user defined code on the package artifact after at least one of the copying and the registering.

15. The non-transitory computer readable medium of claim 14, wherein in managing the infrastructure package, the instructions, when executed, further cause the processor to perform the following:

downloading the infrastructure package from the central repository;

validating the infrastructure package;

performing a management action; and executing the user defined code on the downloaded infrastructure package after at least one of the validating and the performing the management action.

* * * * *